(12) United States Patent
Bettini et al.

(10) Patent No.: US 8,918,882 B2
(45) Date of Patent: *Dec. 23, 2014

(54) QUANTIFYING THE RISKS OF APPLICATIONS FOR MOBILE DEVICES

(71) Applicant: Appthority, Inc., San Francisco, CA (US)

(72) Inventors: Anthony John Bettini, San Francisco, CA (US); Kevin Watkins, San Francisco, CA (US); Domingo J. Guerra, San Francisco, CA (US); Michael Price, San Ramon, CA (US)

(73) Assignee: Appthority, Inc., San Franscisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/205,220

(22) Filed: Mar. 11, 2014

(65) Prior Publication Data

US 2014/0196150 A1    Jul. 10, 2014

Related U.S. Application Data

(63) Continuation of application No. 13/740,036, filed on Jan. 11, 2013, now Pat. No. 8,713,684.

(60) Provisional application No. 61/603,134, filed on Feb. 24, 2012.

(51) Int. Cl.
*G06F 11/00* (2006.01)
*G06F 21/57* (2013.01)
*G06F 21/51* (2013.01)

(52) U.S. Cl.
CPC .............. *G06F 21/577* (2013.01); *G06F 21/57* (2013.01); *G06F 21/51* (2013.01)

USPC ......... 726/24; 726/1; 726/22; 726/23; 726/25

(58) Field of Classification Search
CPC ......... G06F 21/00; G06F 21/10; G06F 21/56; G06F 21/561; G06F 11/3072; G06F 21/577; G06F 21/51; G06F 21/57
USPC .................................................. 726/1, 22–25
See application file for complete search history.

(56) References Cited

U.S. PATENT DOCUMENTS

| | | | |
|---|---|---|---|
| 7,779,472 | B1 | 8/2010 | Lou |
| 8,756,693 | B2 | 6/2014 | Dube et al. |
| 2007/0294273 | A1 | 12/2007 | Bendeck et al. |
| 2008/0134138 | A1 | 6/2008 | Chamieh et al. |
| 2012/0072991 | A1* | 3/2012 | Belani et al. ............ 726/25 |
| 2012/0110674 | A1 | 5/2012 | Belani et al. |
| 2012/0246484 | A1 | 9/2012 | Blaisdell et al. |
| 2013/0097660 | A1 | 4/2013 | Das et al. |
| 2013/0097709 | A1* | 4/2013 | Basavapatna et al. ......... 726/25 |
| 2013/0212638 | A1 | 8/2013 | Wilson |

OTHER PUBLICATIONS

Seo et al., Analysis on Maliciousness for Mobile Applications, 2012 Sixth International Conference on Innovative Mobile and Internet Services in Ubiquitous Computing, pp. 126-129, 2012.

* cited by examiner

*Primary Examiner* — Thanhnga B Truong
(74) *Attorney, Agent, or Firm* — Van Pelt, Yi & James LLP

(57) ABSTRACT

Quantifying the risks of applications ("apps") for mobile devices is disclosed. In some embodiments, quantifying the risks of apps for mobile devices includes receiving an application for a mobile device; performing an automated analysis of the application based on a risk profile; and generating a risk score based on the automated analysis of the application based on the risk profile.

30 Claims, 8 Drawing Sheets

FIG. 4

EASE | APPLICATIONS - MOZILLA FIREFOX

FILE  EDIT  VIEW  HISTORY  BOOKMARKS  TOOLS  HELP

EASE | APPLICATIONS  +

APPERIAN.COM  HTTPS://QAEASE.APPERIAN.COM/INDEX.PHP/ apperian

402

SQUID TESTING 01                                    WELCOME, CIM BUSER (ADMIN) | LOGOUT | HELP

APPLICATIONS                                                              ✚ ADD APPLICATION

| APPLICATIONS (49) | NAME ⇕ | | | DESCRIPTION | VERSION | TYPE ⇕ | CATEGORIES ⇕ | LAST UPLOADED |
|---|---|---|---|---|---|---|---|---|
| USERS (23) | APP CATALOG [CATALOG] DETAILS \| EDIT \| DELETE | ○ | ★★★★★ | SDF | 2.3.0.6977 | IOS: PHONE+TABLET | COMPANY WIDE | 05/04/2012 |
| GROUPS (2) | APPCATALOG [CATALOG] DETAILS \| EDIT \| DELETE | ○ | ★★★★★ | SHORT | 0.5.6915 | ANDROID V2: PHONE+TABLET | COMPANY WIDE | 04/23/2012 |
| CATEGORIES (30) SETTINGS REPORTS IDEAS MY ACCOUNT | ACTIONS DETAILS \| RATINGS \| EDIT \| DELETE | ○ | ★★★★☆ | SHORT | 1.0 | IOS: PHONE+TABLET | COMPANY WIDE | 05/07/2012 |
| | ANDROID-11-SMALL_MED DETAILS \| RATINGS \| EDIT \| DELETE | ○ | ★★★★★ | ANDROID-11-SMALL_MEDIUM | 1.0 | ANDROID V2: PHONE | COMPANY WIDE | 02/21/2012 |
| | ANDROIDPHONE DETAILS \| RATINGS \| EDIT \| DELETE | ○ | ★★★★★ | SHORT | 1.0 | ANDROID V2: PHONE | COMPANY WIDE | 02/27/2012 |
| | AUTOMATION ANDROID APPLICATION DETAILS \| RATINGS \| EDIT \| DELETE | ○ | ★★★★★ | AUTOMATION SHORT DESCRIPTION | V1.5.3 | ANDROID V2: PHONE | COMPANY WIDE | 03/07/2012 |

- FILE MD5: 314B4516793879B21C822AFB5A718A15
- FILE SHA-1: 0D72075CB3E9D2BAA35FB78E3DFF969C514BF2CB
- APPLICATION FILE SIZE: 682201
- APPLICATION VERSION: 1.0
- SUBMISSION RECEIVED: 2012-04-27 16:55:08 UTC
- ANALYSIS PROGRESS: 100% COMPLETE
- SCANNED WITH ENGINE VERSION: 2.2.0
- SCANNED WITH RULE SET VERSION: 1.6.0

RISKY BEHAVIORS:

- THIS APPLICATION WASN'T COMPILED AS A POSITION INDEPENDENT EXECUTABLE (PIE) WHICH CAN EXPOSE THE APPLICATION TO MEMORY CORRUPTION ATTACKS.
- THIS APPLICATION WASN'T FOUND ON THE OFFICIAL APPLE APP STORE. THE ORIGINS OF THIS APPLICATION CANNOT BE VERIFIED.

PRIVACY BEHAVIORS:

- THIS APPLICATION INCLUDES FILE PATHS TO SOURCE CODE FILES IN DEBUG INFORMATION STORED WITHIN THE APPLICATION EXECUTABLE IMAGE. THESE PATHS OFTEN INCLUDE USERNAMES OR OTHER INFORMATION RELATED TO THE DEVELOPER OF THE APPLICATION. THIS INFORMATION COULD BE USED TO ASSIST IN TARGETING THE APPLICATION DEVELOPER OR DEVELOPMENT COMPANY.
- THIS APPLICATION INCLUDES FILE PATHS TO SOURCE CODE FILES IN DEBUG INFORMATION STORED WITHIN THE APPLICATION EXECUTABLE IMAGE. THESE PATHS OFTEN INCLUDE USERNAMES OR OTHER INFORMATION RELATED TO THE DEVELOPER OF THE APPLICATION. THIS INFORMATION COULD BE USED TO ASSIST IN TARGETING THE APPLICATION DEVELOPER OR DEVELOPMENT COMPANY.

HOSTNAME AND IP ADDRESSES:

| HOSTNAME/ADDRESS | REPUTATION |
| --- | --- |
| HTTPS://APPRAMP.APPERIAN.COM/PUBLIC-EASE-SDK.INTERFACE.PHP | N/A |
| IDAP://LOCALHOST/ | N/A |
| HTTPS://WWW.APPLE.COM/APPLECA/0 | N/A |
| HTTP://WWW.APPLE.COM/APPLECA/0 | N/A |

APPERIAN HOME   PRIVACY POLICY

QUANTIFYING THE RISKS OF APPLICATIONS FOR MOBILE DEVICES

CROSS REFERENCE TO OTHER APPLICATIONS

This application is a continuation of co-pending U.S. application Ser. No. 13/740,036, entitled QUANTIFYING THE RISKS OF APPLICATIONS FOR MOBILE DEVICES, filed Jan. 11, 2013, which claims priority to U.S. Provisional Patent Application No. 61/603,134, entitled QUANTIFYING THE RISKS OF APPLICATIONS, filed Feb. 24, 2012, both of which are incorporated herein by reference for all purposes.

BACKGROUND OF THE INVENTION

An application, also referred to as an "app," generally refers to a software application that executes on a computing device, such as a mobile device. For example, mobile devices include smart phones, tablets, laptops, and/or other mobile devices. Various application platforms exist for different operating systems, such as Microsoft Windows® platforms, Google Android® platforms, and Apple iOS® platforms. Application markets exist for each of these application platforms, which can make available thousands to millions of different apps for such platforms.

For example, various apps are available for executing on smart phones such as the HTC EVO® or Apple iPhone®, tablets such as the Motorola Xoom® or Apple iPad®, embedded devices executing the Google Android® operating system such as those shipped by Mentor Graphics and their partners, and computer operating systems such as Apple Mac OS X® and Microsoft Windows 8®.

BRIEF DESCRIPTION OF THE DRAWINGS

Various embodiments of the invention are disclosed in the following detailed description and the accompanying drawings.

FIG. 4 is a screen diagram of an apps view of a user interface for a platform for quantifying risks of apps for mobile devices in accordance with some embodiments.

DETAILED DESCRIPTION

Figure 1:
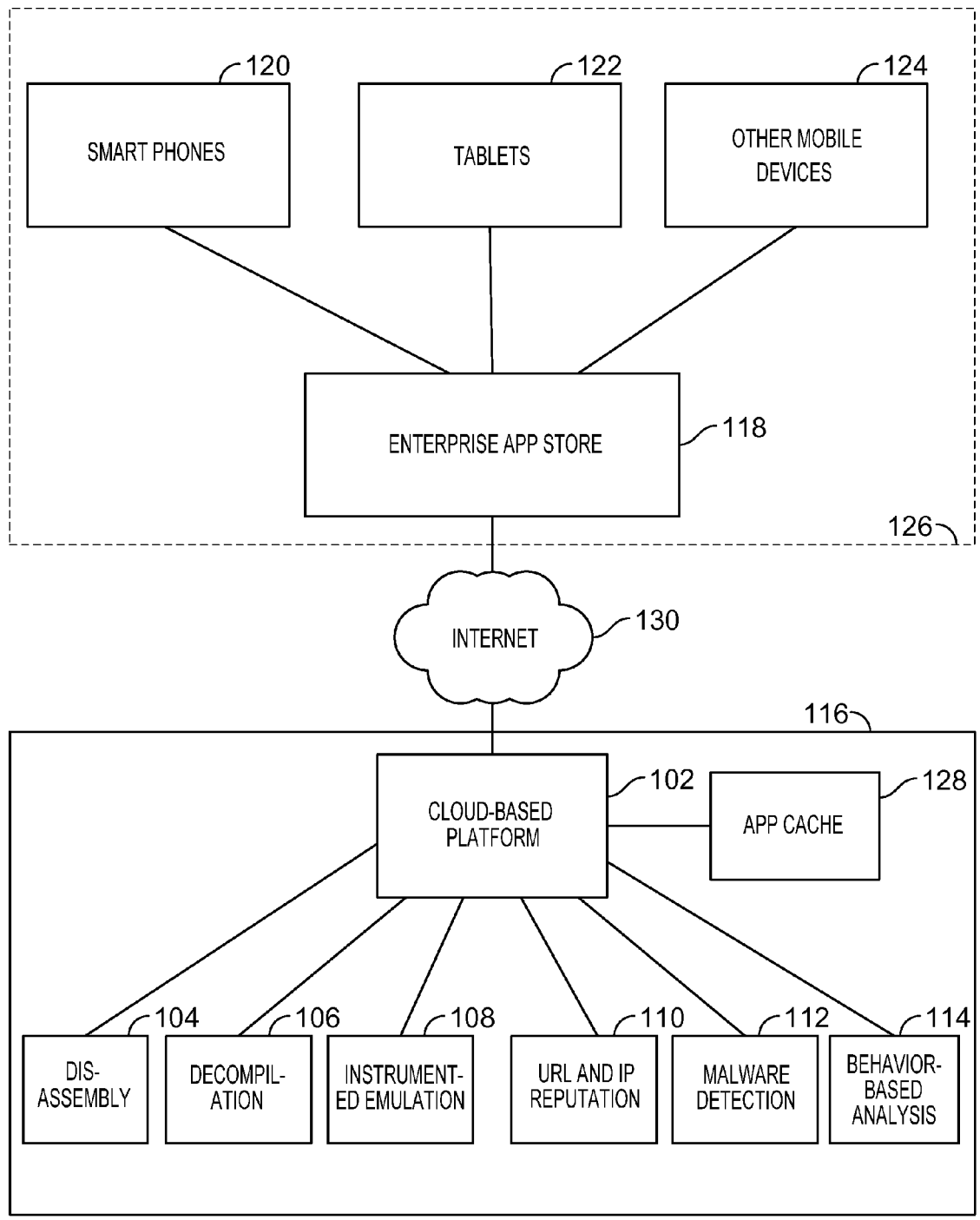
FIG. 1 is a functional block diagram of an architecture for quantifying the risks of applications ("apps") for mobile devices in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An application, also referred to as an "app," generally refers to a software application that executes on a computing device, such as a mobile device (e.g., a mobile device refers to a computing device that includes a processor for executing a software application). For example, mobile devices include smart phones, tablets, laptops, and/or other mobile devices. Various application platforms exist for different operating systems, such as Microsoft Windows® platforms, Google Android® platforms, and Apple iOS® platforms. Application markets (e.g., app stores) exist for each of these application platforms, which can make available thousands to millions of different apps for such platforms.

For example, various apps are available for executing on smart phones such as the HTC EVO® or Apple iPhone®, tablets such as the Motorola Xoom® or Apple iPad®, embedded devices executing the Google Android® operating system such as those shipped by Mentor Graphics and their partners, and computer operating systems such as Apple Mac OS X® and Microsoft Windows 8®.

Also, as these operating system platforms for mobile devices converge with legacy computer desktop and laptop operating system platforms (e.g., Microsoft Windows® 8 and Apple Mac OS X®), similar app markets and availability of common apps across such platforms are becoming increasingly common.

With hundreds of thousands to millions of different apps for such platforms available to consumers, enterprises (e.g., various entities, including corporate entities, government entities, and other entities) are confronted with supporting and/or managing these various devices that can have a variety of such apps on users' devices. Enterprise challenges include the increasing usage by, for example, employees of their own devices (e.g., bring your own devices ("BYOD") to work) that can have access to corporate resources (e.g., employee smart phones, tablets, etc.). The ever growing number and variety of apps also poses a significant challenge for entities to manage and monitor the downloading, installation, and usage of such apps by users on devices that can have access to corporate resources.

However, the trend towards using these apps for enterprise uses and/or on devices that may have enterprise access also presents new and complex challenges for enterprises (e.g., Information Technology (IT) at enterprises and/or management for such enterprise's information and technology) and for consumers to understand risks posed by such apps. In particular, these apps can present various risks to the enterprise and/or users.

For example, apps can have access to enterprise resources, such as a corporate address book, corporate intellectual property, corporate Wi-Fi network(s), VPN access, and/or various other enterprise resources. Because apps can have access to corporate resources, it is desirable for the enterprise to understand and quantify the risks associated with apps that have been downloaded or can be downloaded to devices used by, for example, employees of the entity or other users who have access to any enterprise resources (e.g., on the mobile device and/or on the enterprise network).

Mobile devices present unique challenges as a majority or significant amount of the mobile malware and risky behaviors are delivered through apps (e.g., payloads with apps). In particular, app markets expose the undesirable trends of increasing malware present in various apps or vulnerabilities of such apps that can be exploited by malware or sophisticated attacks (e.g., intrusions, etc.), privacy risks (e.g., spyware or other malware), resource usage (e.g., CPU, memory, storage, battery, network, and/or other physical device resources), and/or other intellectual property related risks (e.g., data loss, intellectual property theft, etc.) exposed by such apps and/or vulnerabilities present in such apps. As the app market evolves and sophistication of the security risks increase, the approach of only using blacklists is generally insufficient to address these evolving security related challenges of apps for mobile devices.

What are needed are techniques for analyzing apps and reporting on risks associated with such apps. Accordingly, quantifying the risks of applications ("apps") for mobile devices is disclosed. In some embodiments, quantifying the risks of apps for mobile devices includes receiving an application for a mobile device; performing an automated analysis of the application based on a risk profile; and generating a risk score based on the automated analysis of the application based on the risk profile.

In some embodiments, quantifying the risks of apps for mobile devices further includes determining whether the application is risky (e.g., a security risk) based on the risk score. In some embodiments, quantifying the risks of apps for mobile devices further includes reporting the risk score.

In some embodiments, quantifying the risks of apps for mobile devices further includes determining whether the application is in violation of a policy. In some embodiments, quantifying the risks of apps for mobile devices further includes determining a reputation associated with the application. For example, determining a reputation associated with the application can be based on a vendor or distributor associated with the application and/or other criteria (e.g., using collective app intelligence techniques as described herein).

In some embodiments, quantifying the risks of apps for mobile devices further includes performing a static analysis on the application during the automated analysis of the application based on the risk profile. In some embodiments, quantifying the risks of apps for mobile devices further includes performing a dynamic analysis on the application during the automated analysis of the application based on the risk profile. For example, performing the dynamic analysis can include simulating a plurality of behaviors of the application during execution on a mobile device platform.

In some embodiments, quantifying the risks of apps for mobile devices further includes customizing the risk score based on a customized risk scoring profile. For example, the customized risk scoring profile can be customized for a particular enterprise, which defines various criteria for their app risk scoring profile.

In some embodiments, quantifying the risks of apps for mobile devices further includes determining whether the application performs any malicious, suspicious, and/or unauthorized or undesirable behaviors.

In some embodiments, quantifying the risks of apps for mobile devices further includes determining whether the application performs unauthorized network usage.

In some embodiments, quantifying the risks of apps for mobile devices further includes determining whether the application performs unauthorized data usage.

In some embodiments, quantifying the risks of apps for mobile devices further includes determining whether the application performs unauthorized voice usage.

In some embodiments, quantifying the risks of apps for mobile devices further includes determining whether the application performs unauthorized text messaging.

In some embodiments, quantifying the risks of apps for mobile devices further includes determining whether the application performs unauthorized phone calls.

In some embodiments, quantifying the risks of apps for mobile devices further includes determining whether the application performs unauthorized location tracking.

In some embodiments, quantifying the risks of apps for mobile devices further includes determining whether the application performs unauthorized identification of user(s).

In some embodiments, quantifying the risks of apps for mobile devices further includes determining whether the application performs unauthorized usage of device features or functions (e.g., unauthorized usage of device cameras/video functionality, GPS functionality, Wi-Fi or hot spot functionality, etc.).

In some embodiments, quantifying the risks of apps for mobile devices further includes determining whether the application performs activities that are beyond user permissions (e.g., user configured permission settings).

In some embodiments, quantifying the risks of apps for mobile devices further includes determining whether the application requests user permissions for activities that are not performed.

In some embodiments, quantifying the risks of apps for mobile devices further includes associating a risk factor based on collective intelligence that is associated with the application.

In some embodiments, quantifying the risks of apps for mobile devices further includes analyzing apps and generating an assessment of the risk(s) associated with the apps, in which the assessment can be provided to partners, customers (e.g., enterprises, device users, etc.), app developers, and/or app markets (e.g., as a data feed for subscribers of an app risk assessment service).

In some embodiments, quantifying the risks of apps for mobile devices further includes performing a plurality of analysis techniques to determine if apps present any risks (e.g., using a cloud-based platform for quantifying the risks of apps for mobile devices that implements a phased approach to risk assessment of apps for mobile devices), including, for example, performing one or more of the following: disassembly, decompilation, instrumented emulation, URL and IP reputation associated with the app, malware detection, and behavior-based analysis.

For example, ACME Corporation has hundreds or thousands of employees. Some employees of ACME Corporation use various company issued mobile devices, such as laptops. Many employees of ACME Corporation also use their own personal mobile devices, such as smart phones and/or tablets to access various corporate Information Technology (IT) resources, including the corporate network (e.g., wireless network), email, contacts/directory information, and/or calendar information (e.g., available through Microsoft Outlook or other similar software tools). The corporate IT team at ACME Corporation wants to provide an enterprise managed app store, which can be used by their employees (e.g., and/or contractors, and/or others associated with ACME Corporation) to download and install apps to their mobile devices. Also, many employees of ACME Corporation bring their own mobile devices to work to use for work purposes as well as personal purposes (e.g., BYOD to work, which is becoming increasingly common as companies allow their users to select and often purchase their own smart phones, tablets, laptops, etc. that can then be configured to access corporate IT resources, such as email, calendar, contacts, networks, files, etc.). However, the corporate IT team needs to be able to have an efficient and reliable solution for ensuring that the apps that are in the enterprise app store meet the enterprise's requirements for apps, such as security, privacy, and/or other requirements. The platform for quantifying the risks of apps for mobile devices described below with respect to FIG. 1 provides an efficient and reliable solution for ensuring that the apps that are available in the enterprise app store meet the ACME Corporation's requirements for apps, such as security, privacy, and/or other requirements, as described further below.

As an example, Bob, who is an employee of ACME Corporation, has an Apple iPhone® smart phone that can download apps for the Apple iOS® platform. The corporate IT team for ACME Corporation can configure a custom profile that can be used by the platform to report on apps available for the Apple iOS® platform to automatically determine whether such apps should be available in the enterprise app store or not (e.g., to analyze apps for risks based on an enterprise policy for ACME Corporation, to block risky apps based on their policy to protect data and privacy from being available in their enterprise app store or enterprise app catalog, while still facilitating availability of apps that are acceptable based on their enterprise policy and support their business needs). As examples, the corporate IT team for ACME Corporation can disallow any apps that can perform any of the following: (1) attempt to access contacts without user permission; (2) attempt to access location information without user permission; and (3) attempt to send SMS/text messages without user permission, in which any such apps that include any of these attributes can be removed and disallowed from being available in the enterprise app store. Various other examples for monitoring apps for various mobile device platforms are described below in further detail with respect to various embodiments.

Accordingly, using the platform for quantifying the risks of apps for mobile devices can facilitate the corporate IT team for ACME Corporation to maintain an enterprise App store that only includes apps that have been analyzed and satisfy certain app risk assessments based on standard and/or enterprise configured criteria (e.g., security risks, privacy risks, protect against app-level targeted attacks, corporate data exfiltration, and intellectual property exposure, etc.) to thereby centrally manage app inventory for its users (e.g., based on a corporate policy, such as an enterprise app risk profile and requirements for ACME Corporation) using cloud-based (e.g., off device) techniques.

FIG. 1 is a functional block diagram of an architecture for quantifying the risks of applications ("apps") for mobile devices in accordance with some embodiments. As shown, a platform 116 is provided for quantifying the risks of apps for mobile devices that is in communication with an enterprise network 126 via the Internet 130. The enterprise network 126 includes an enterprise app store 118 (e.g., an enterprise that has its own internal app store for providing apps for mobile devices used by its users, such as its employees, contractors, etc.) that provides apps for enterprise mobile devices, including smart phones 120, tablets 122, and/or other mobile devices 124 (e.g., laptops, etc.). For example, using the various techniques described herein, the platform 116 can be used to automatically assess the risks of apps being distributed by the enterprise app store 118 (e.g., based on a policy, such as an enterprise risk policy/profile). Accordingly, the platform 116 screens all apps that are available in the enterprise app store 118.

In some embodiments, the platform 116 implements a holistic approach to screening apps, and can automatically analyze apps for mobile devices to determine various properties, such as one or more of the following: market reputation of the app; presence of malware; insecure programming practices; malicious changes to existing apps; data exfiltration; corporate intellectual property (IP) impacts; cryptographic weakness or implementation faults; security risks; privacy concerns (e.g., location tracking, extracting contact book, sharing browsing history, etc.); energy usage (e.g., CPU cycles measured and compared with apps in similar categories or other versions of the same app, such as Facebook app version X v. version Y); and network usage. For example, these techniques performed by the platform 116 can be implemented as a fully automated solution for quantifying the risks of apps for mobile devices that can increase the detection of known malware, screen for new and/or unknown malware, identify risks in operating systems (e.g., including the Google Android® operating system and the Apple iOS® operating system), and can integrate with a mobile device management (MDM), app store, and integrated development environment (IDE) solutions.

In some embodiments, the platform 116 implements the holistic approach to screening apps using a phased implementation to risk assessment of apps for mobile devices. As shown, the platform 116 includes a cloud-based platform 102. For example, the cloud-based platform 102 can provide a global app cache (e.g., the platform 116 can service a plurality of enterprise app stores), including an app cache 128 for caching results for previously analyzed apps as shown in FIG. 1. The cloud-based platform 102 is in communication with a series of data collection engines, including: a disassembly engine 104, a decompilation engine 106, an instrumented emulation engine 108, a URL and IP reputation engine 110, a malware detection engine 112, and a behavior-based analysis engine 114. For example, the platform can include various engines, such as shown, for performing various functions and collecting various data based on the functions, which can be used for later app risk assessment and analysis as well as shared with one or more of the various other engines, such as described herein with respect to various embodiments.

In some embodiments, the platform 116 for quantifying the risk of apps has the following characteristics: varying a number of phases of data collection and analysis, depending upon the platform and type of app; a series of phases of analysis that run, for purposes of collecting data, followed by a collection of rules that then process the collected data; rules that identify behaviors, characteristics, or properties, which present risks to the enterprise or consumer; and a report generation phase, in which the relevant findings/results from the rules execution phase are reported to end users (e.g., the enterprise and consumers).

Figure 2:
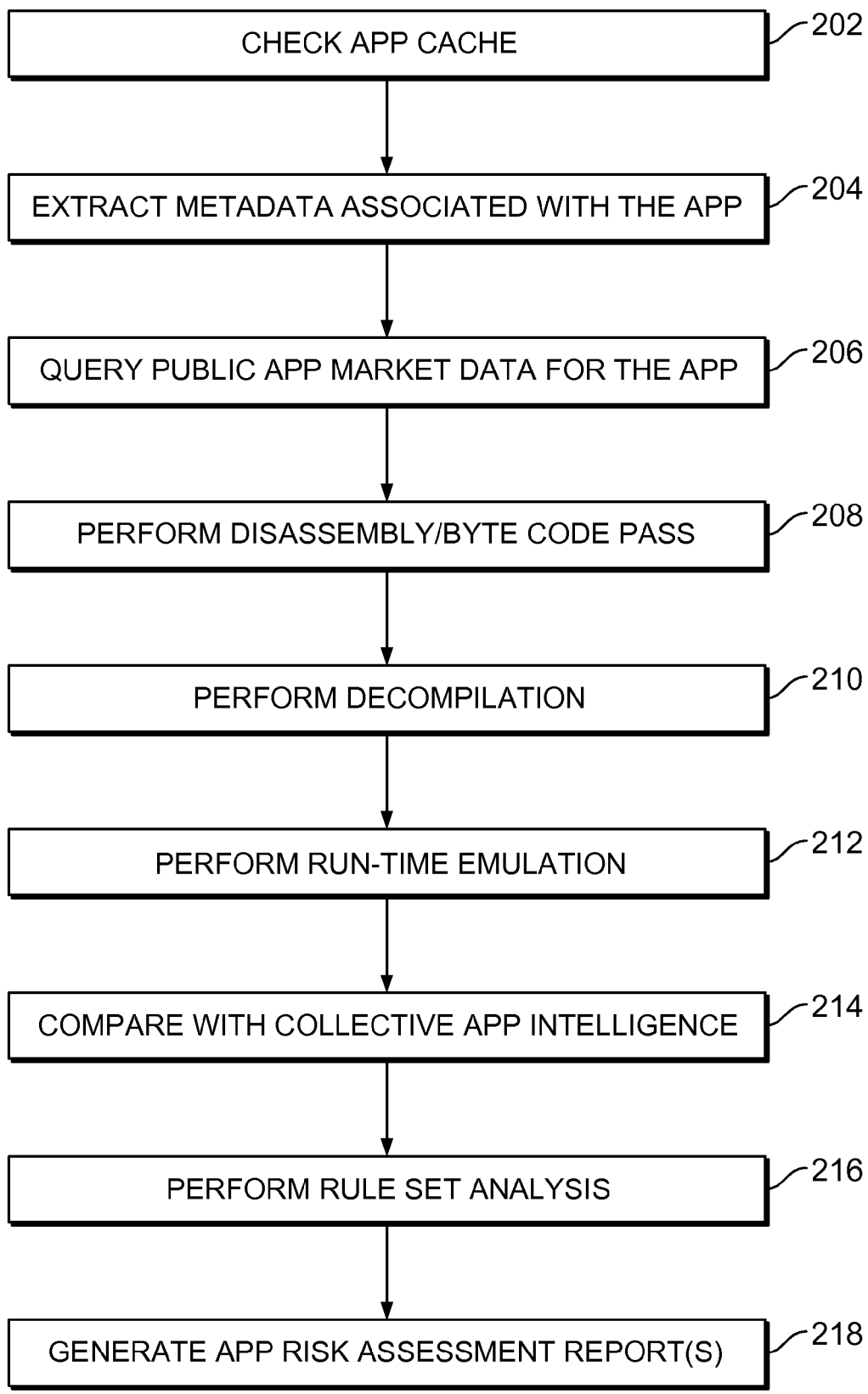
FIG. 2 is a flow diagram for quantifying the risks of apps for mobile devices in accordance with some embodiments.

FIG. 2 is a flow diagram for quantifying the risks of apps for mobile devices in accordance with some embodiments. In some embodiments, a platform for quantifying the risks of apps for mobile devices implements a phased approach to risk assessment of apps for mobile devices. In some embodiments, the phased approach includes one or more of the phases as shown in FIG. 2 and discussed in detail below. In some embodiments, the platform for quantifying the risks of apps for mobile devices uses a series of data collection engines for implementing the phased approach, such as shown in FIG. 1.

In some embodiments, an app query to the platform for quantifying the risks of apps for mobile devices initiates the process. For example, an enterprise app store (e.g., enterprise app store 118 as shown in FIG. 1, which can be implemented using a commercially available MDM solution) can communicate with a cloud service/web platform for quantifying the risks of apps for mobile devices (e.g., platform 116 as shown in FIG. 1) using a web service (e.g., RESTful web API or REST API) to communicate an app (e.g., one or more apps for the enterprise app store) that is to be automatically analyzed for a risk assessment by the cloud service/platform. In some embodiments, the Rest API supports auth tokens for providing authorization and authentication of such app queries to provide a secure communication mechanism. At 202, in response to the app query, a pre-screen analysis phase is performed that includes checking an app cache (e.g., a cache that includes information for apps that were previously analyzed by the platform). In some embodiments, if the platform has already analyzed that app (e.g., that particular version of the app), then the previously determined risk score (e.g., app reputation score and possible additional data) is returned (e.g., at near wire speed). This approach highlights the value of pre-screening apps (e.g., several hundreds of thousands of apps can have already been pre-screened by the platform using these techniques).

In some embodiments, after uploading an application (e.g., an App container) using the Rest API, an application ID number is returned. For example, the application ID number can be used as a key to view the results or to perform more advanced analysis. In some embodiments, various fields are used including the following: an application data field is used to identify the app file; and an origin field is used to set the source (e.g., origin) of an app. For example, the origin field can be set to "public" or "private" depending on where the application came from, with "public" indicating that the app is from a public source (e.g., a public app store) and "private" indicating that the app is primarily used internally and not meant for general consumption. Among other restrictions, apps marked as private can be hidden from global app cache queries.

In some embodiments, the returned app ID can be used for subsequent queries based on the app ID, such as for reports based on one or more provided App IDs (e.g., individual app query—reporting on an individual app based on a request to find a specified app in the global cache, bulk app query—reporting on a plurality of apps based on a bulk request to find apps in the global cache, updated reports, and/or more advanced reports). In some embodiments, polling is supported to determine when the platform has completed the analysis of an app (e.g., based on a specified app ID) and that a report is ready based on the completed analysis by the platform. In some embodiments, querying (e.g., using the Rest API) the platform to find applications that have already been analyzed by the platform and are stored in the global app cache (e.g., app cache 128 as shown in FIG. 1) are supported (e.g., comparing an app file hash to hash stored in the global app cache, querying by the app name, and/or using various other techniques), as described in further detail below.

In some embodiments, such app queries will have already been analyzed by the platform and, thus, will trigger a near wire speed response to such app queries. In particular, in many cases the app will already be part of the app cache (e.g., app cache 128 as shown in FIG. 1) and already analyzed. In some embodiments, to check if the app is already in the app cache, all that is needed is a hash of the application (e.g., using a hashing algorithm, such as MD5, SHA-1, SHA-256, or another hashing algorithm) to query the app cache for a match.

In some embodiments, an app query specifies one or more of the following: a unique ID for the transaction, a match type (e.g., all to return all app matches, latest to return a newest app match), platform (e.g., Google Android platform, Apple iOS platform, Microsoft Windows platform, etc.), app name, app version, package name (e.g., package name for Android apps, bundle identifier for iOS apps), source of the app (e.g., enterprise or device), app size (e.g., Android APK file size, iOS bundle size), app size memory (e.g., iOS dynamic size), app hash (e.g., such as MD5, SHA-1, SHA-256, or another hashing algorithm), app signature (e.g., a signature for Android apps), item ID (e.g., iOS 9-digit number specific to iOS apps, Android Market asset ID for Android apps), and local (e.g., specifying the language of the report data).

Below is an example query to the platform from an app catalog (e.g., an app store, such as an enterprise app store).

API Name: query_app
API Description: queries one individual app, returns one result; does not require a sequence number; similar format to bulk_query_app; can produce findings based on incomplete metadata
Type of HTTP call: POST
Parameters: [0 required, 13 optional]
- sequence_num (optional) (a unique ID for the transaction)
- platform (optional) {Android, iOS, Windows, etc.}
- app_name (optional) (Name of the app)
- app_version (optional) (Version of the app)
- package (optional) (Package name for Android apps; Bundle Identifier for iOS apps [may be referred to as URL/URIs])
- app_location_source (optional) { enterprise, device }
- app_size_disk (optional) (Android APK file size; iOS Bundle Size)
- app_size_memory (optional) (C Dynamic Size)
- app_hash_md5 (optional) (MD5 of the APK/XAP file itself; on iOS, MD5 of the app

```
executable, which is contained within the IPA [ZIP] archive)
- app_hash_sha1 (optional) (SHA-1 of the APK/XAP file itself; on iOS, SHA-1 of the
app executable, which is contained within the IPA [ZIP] archive)
- app_hash_sha256 (optional) (SHA256 of the APK/XAP file itself; on iOS, SHA256 of
the app executable, which is contained within the IPA [ZIP] archive)
- app_signature (optional) (Specific to Android, looks like:
ZdKozWeudHKt2VwVCFpH7dMi2hE)
- item_id (optional) (9-digit # that is specific to iOS apps; on Android Market asset id)
```

The above example is an example of querying one individual app. As further described herein with respect to various embodiments, the platform also supports "bulk queries" whereby, for example, a customer (e.g., an app store/app catalog, the MDM server, the MAM app catalog, etc.) can submit to the app risk assessment platform the metadata on a plurality of apps (e.g., hundreds to thousands of apps at a time), and the platform replies with the results for each of the analyzed apps.

In some embodiments, a customer of the service for quantifying the risks of apps for mobile devices can query the platform as described herein. In some embodiments, each customer can create users for the organization, which may have varying permissions. For example, the corporate IT team of ACME Corporation can have one or more users that have accounts with access to the platform. The corporate IT team can also configure their account to have specific IT requirements for apps scanned on behalf of ACME Corporation (e.g., custom scanning, and/or custom reporting requirements, such as based on security requirements, privacy requirements, and/or various other criteria as described herein). The corporate IT team can also create scripts that automatically query the platform for reports on apps being considered for adding to the enterprise app store, including existing apps (e.g., previously scanned apps), updated versions of existing apps, and/or new apps. Using these techniques, the corporate IT team can effectively manage the enterprise app store to ensure that the apps available in the enterprise app store satisfy their corporate IT requirements (e.g., security, privacy, device integrity, network integrity, etc.).

In particular, if the app already exists in the app cache (i.e., there is a match to the query of the app cache), then the pre-existing app ID will be returned. Otherwise, that is, if the app cache check does not result in a match or hit, then processing continues to stage 204, which is discussed below.

In some embodiments, a phased analysis is performed by the platform for quantifying the risks of apps for mobile devices, in which data is collected at each phase or stage of analysis by the platform for a given app being analyzed for a risk assessment. At 204, metadata associated with the app is extracted. In particular, metadata associated with the app can include information that is important for assessing the overall risk(s) associated with the app. For example, this phase can include parsing an XML file associated with the app that hosts general app information. Metadata associated with the app that can be analyzed includes app permissions, intents, services, and receivers. In particular, this phase can include mapping out app permissions, file and version name, app author, app ID, package name, and/or various other attributes and/or metadata associated with the app. In some embodiments, this stage further includes inspecting app components including accepting a component of an app, such as a metadata file or an executable image, absent in the remainder of the app, to analyze and generate any potential findings based on the parsed and analyzed metadata associated with the component of the app. As discussed further below with respect to stage 206, metadata associated with finding the app on the public and/or private app markets includes artist and publisher information, item IDs, genre IDs or categories, price for purchasing the app, release date of the app (e.g., app version), software version external identifiers, and vendor ID.

At 206, a query of public app market data for the app is performed. In particular, querying the public market(s) for data on the app can facilitate significant information about an app's risk based on an analysis of the public market data identified as associated with the app (e.g., using app descriptions, app rankings in the store, vendor reputations, and/or various other types of information). For example, various app attributes and/or metadata can be compared with such data for apps in public app markets. In particular, public app markets are generally available to consumers, such as Apple's App Store, Amazon's and Google's Android App Market, Microsoft's App Store, and other public app stores, unlike enterprise app markets which are generally only available to permitted enterprise users, such as enterprise employees and contractors. In some embodiments, the query of public app market data includes the following types of data (e.g., to facilitate analyzing whether such enterprise apps being analyzed have been repackaged with malware, such as a different version of an Angry Birds® app that has been re-packaged with malware): app size, content, version, and/or various other types of data. In some embodiments, analytics are performed on the app download count, user ratings, and developer reputation data. For example, for Android-based apps, each app's manifest can be deobfuscated (e.g., using Android APIs) and parsed to extract information of interest and for further analysis, as described above.

There are various examples in which this phase for querying of public app market data for the app can assist in determining an overall risk assessment for the app. As an example, a source of the app (e.g., which app market or app markets it's available from) can have an impact on an overall app risk, because some app markets are known to be riskier than other app markets. As another example, a new app with fewer downloads can have a higher risk than an older app with a larger number of downloads. As another example, an app developer's reputation can also have an impact on an overall app risk assessment. As another example, an average user rating can also have an impact on overall app risk assessment.

As another example, an app's file name, version, and app size can be compared between the publicly available app and the app submitted by the enterprise. If these fields vary, then these results indicate that the app may have been repackaged, which can also have an impact on overall app risk assessment (e.g., as such can indicate that the app could have been repackaged with a higher app risk). As another example, given that apps are typically signed by a developer with a private key and include information on who created the key, if an app is signed and includes different information than the publicly available app, this determination can also have an impact on overall app risk assessment (e.g., as such, can also indicate that the app could have been repackaged with a higher app risk).

In some embodiments, an app is uniquely identified using various techniques. For example, a hash of the app file (e.g., for Android app files, this can be a hash of the container; for iOS app files, this can be a hash of a .ipa file, which is an iPhone application archive file that stores an iPhone app, which is usually encrypted with Apple's FairPlay DRM technology), a hash of the executable, and/or a bundle ID can be used to uniquely identify each app. As an example, this information can be used to compare an app received in a query to the platform to compare it with previously analyzed apps to determine if there is a match with the previously analyzed apps.

In some embodiments, the platform attempts to correlate apps for the Apple iOS® operating system that are received (e.g., from app queries, for apps that are in enterprise app stores and/or are uploaded by users/customers) with apps that have been pre-collected by the platform and that have already been uploaded and analyzed by the platform. As discussed above, iOS-based apps generally include an executable program. In some embodiments, the platform decrypts any such executables included in an iOS-based app prior to uploading them. For example, if a user submits an app from the App Store that includes an encrypted executable, it would not normally match a previously uploaded app, as that app's executable would have been decrypted and, thus, would not be the same. In some embodiments, to solve this problem, the platform performs a series of comparisons, including the following: hashing the pre-collected app (e.g., the app container, including all contents), and comparing this to a hash of the newly uploaded app. If this hash matches, no further work is required. If a match is not made, then the executables for both the new and pre-existing apps are compared. For example, to make comparison of executables more likely to succeed, the platform can save the hash for both the encrypted as well as the unencrypted executable for every pre-collected app, and can then compare a hash of the newly uploaded app's executable to both of these values. If there is a match, then no further work is required. Otherwise, metadata from both apps including the app's "bundle identifier" and version can be compared, and if a match is made, no further work is required. Accordingly, using these three different matching techniques, it is possible to reliably match newly uploaded apps to apps previously uploaded to the platform, whether their executables re-encrypted or not.

In some embodiments, handling of DRM-related mechanisms, such as executable image encryption, is also provided using various techniques. In particular, if an app that is received by the platform is encrypted using DRM technology (e.g., apps for the iOS platform can be encrypted using DRM technology), then various approaches can be used to facilitate processing the app using the various phases and collection/analysis engines described herein with respect to various embodiments. In some embodiments, the platform can handle the encryption of apps in one of a variety of ways. An example technique that the platform can perform is to correlate the encrypted app with an unencrypted version of the app to match the app with such an unencrypted version of the app, such as based on the digital signature (e.g., a hash, such as using MD5, SHA-1, SHA-256, or another hashing algorithm) of the encrypted executable image of the app. As another technique, the platform can also decrypt the encrypted app on native hardware (e.g., leverage one or more iOS devices that have previously been jail broken to decrypt the apps natively at run-time). As yet another technique, the platform can decrypt the encrypted app using pure software decryption leveraging private keys from the operating system or native hardware.

At 208, a disassembly/byte code pass of the app is performed to provide a static analysis phase (e.g., as apps are typically provided by the enterprise app stores/public app stores only in executable formats). In some embodiments, a disassembly/byte code pass phase is performed using a disassembler, such as a disassembly engine (e.g., disassembly engine 104 as shown in FIG. 1). In some embodiments, a disassembly/byte code pass phase includes inspecting byte code or assembly language (e.g., if applicable) to determine what the app is supposed to do—how it is coded to perform. For example, native instructions and virtual machine (VM) byte codes can be processed and analyzed. In some embodiments, this phase includes extracting a control flow graph, method and function names, strings, data flow within the app's executable, and/or other information to facilitate a static analysis and/or to facilitate providing a source code conversion for the app, as discussed below in detail with respect to stage 210. For example, app methods, such as encryption methods, can be analyzed for risky behaviors (e.g., using hard-coded passwords to protect private data or calling methods with risky encryption algorithms). As another example, the static analysis phase can include determining whether certain behaviors are implemented by the app (e.g., performing an operation without user permission, such as sending text/SMS messages without a user's permission, using GPS/location services without a user's permission, and/or various other behaviors of potential interest, such as those described herein with respect to various embodiments). As yet another example, native instructions and VM byte codes can be processed and analyzed, and such can also be used to facilitate a source code conversion (e.g., decompilation phase) as further discussed below in detail with respect to stage 210.

At 210, a decompilation phase is performed to facilitate generating a source code version of the app (e.g., apps are typically provided by the enterprise app stores/public app stores only in executable formats). In some embodiments, a decompilation phase is performed using a decompilation engine (e.g., decompilation engine 106 as shown in FIG. 1). In some embodiments, the decompilation phase includes analyzing a software code path and mapping an app action tree. For example, this information can be used to facilitate dynamic analysis using such behavior code path information determined from the source code analysis. For example, this information can be used to compare actual behaviors to permission and intent requests. As another example, the dynamic analysis phase can include simulated behavior to monitor the app's behavior for determining whether certain behaviors are performed by the app (e.g., performing an operation without user permission, such as sending text/SMS messages by monitoring/intercepting attempts to send SMS messages, such as by hooking SMS calls in an Android framework for Android-based apps, and/or various other behaviors of potential interest, such as those described herein with respect to various embodiments). As yet another example, app analysis can also include performing decompilation (e.g., in the case of Android, java files) to identify risky behaviors, such as risky usage of private data and app usage of known risky method calls. In addition, such information can also be used by researchers to easily read and create new rules when an app is flagged as potentially risky.

In some embodiments, a web-based crawling engine for web apps is provided. In some embodiments, this technique includes running through a web-based code coverage tree and testing out available behaviors from the web app. Data is collected during the process so that behavioral rules can be applied to the data findings. Initially, the process enumerates through the web application (crawling), in the form of a discovery phase, to spider the web application looking for as many possible code paths in the tree as possible. Then the dynamic analysis is leveraged and fuzzing occurs (e.g., using a series of engines and rule sets) to find vulnerabilities, risk behaviors, and privacy concerns in the web application.

At 212, a run-time emulation is performed to provide a dynamic analysis phase (e.g., performing dynamic analysis using instrumented emulation). In some embodiments, a run-time emulation phase is performed using an instrumented emulation engine (e.g., instrumented emulation engine 108 as shown in FIG. 1). In some embodiments, the run-time emulation phase includes executing the app on one or more emulators (e.g., virtual machines or emulators, such as a platform version of Android provided using such emulators that simulate an Android app execution environment, in which apps executed in such an environment cannot detect that they are executing in an Android emulation environment as opposed to executing on an actual user's Android mobile device). For example, the dynamic analysis phase can monitor and analyze internal and external app API calls, including kernel level API calls. The dynamic analysis phase facilitates performing a deeper dive into risky behaviors that otherwise can be hidden from a static analysis (e.g., such as new components being downloaded during run-time/execution of the app and/or other suspicious and/or potentially malicious behaviors).

In some embodiments, a dynamic analysis (e.g., instrumented emulation) includes hosting a series (e.g., farm) of emulators, in which instrumenting as part of our analysis is provided. On some platforms, these are forked versions of open source operating systems, in which API hooks into the kernel, virtual machine, system calls, etc. are provided to monitor the apps executed in the emulated environment. On some platforms, a custom kernel and re-implemented standard libraries are used to allow the closed-source operating system apps to monitor the apps executed in the emulated environment. On some platforms, hooking and performing binary patching on "simulators" to monitor the apps are executed in the emulated environment. Once the app is executing in the emulated environment, the dynamic analysis phase collects data on API calls that occur (e.g., and the values returned from those APIs), so that a rule set can be applied to that data set. For example, correlating API calls to permissions can be determined using various static and dynamic techniques described herein to determine whether the app exhibits any behaviors that exceed or are outside the scope of authorizations—proper user permissions. In some embodiments, the apps are instrumented during run-time execution using a combination of one or more of the following: random behaviors, intents from other apps, and control flow graph(s) maps that attempt to reach certain API calls.

At 214, a comparison with collective app intelligence is performed to provide an app reputation phase. In some embodiments, a comparison with collective app intelligence phase is performed using a URL and IP reputation engine (e.g., URL and IP reputation engine 110 as shown in FIG. 1). For example, the collective app intelligence engine can monitor and extract information (e.g., scraping such information from these various app markets/app stores) on various apps and associated app developers across public (e.g., legitimate markets for apps) markets and private (e.g., grey/black markets for apps), which can be used to compare apps between such various markets, including with versions of apps on private app markets. In some embodiments, the app reputation phase includes running new app findings over an entire app library. Thus, this phase facilitates leveraging findings from previous apps to a new scan. In some embodiments, collective app intelligence can include receiving third party analysis input, such as third party input identifying known bad or suspicious IP addresses, URL addresses, SMS numbers, telephone numbers, ad network providers, apps, app developers, app stores, and/or any other information. In some embodiments, the app reputation phase includes comparing reputation data for IP addresses (e.g., the IP reputation, such as IP addresses known to be associated with downloading malware and/or IP addresses known to be associated with command and control (C&C) botnet activities), URL/URI addresses (e.g., the URL/URI reputation, such as URL/URI addresses known to be associated with downloading malware and/or URL/URI addresses known to be associated with command and control (C&C) botnet activities), SMS numbers (e.g., SMS number blacklists), telephone numbers (e.g., telephone number blacklists), ad network providers, and other external calls and/or other information associated with apps. Accordingly, the app reputation phase allows the automated platform to become more and more intelligent with each new app scan as it continues to increase its knowledge about apps, app developers, ad network providers, and related information.

At 216, a rule set analysis is performed to provide a malware detection phase and a behavior-based analysis phase. In some embodiments, a malware detection phase and a behavior-based analysis phase are performed using a malware detection engine and a behavior-based analysis engine (e.g., malware detection engine 112 and behavior-based analysis engine 114 as shown in FIG. 1). In some embodiments, the behavior-based analysis phase includes running data extracted over each phase of analysis through an extensive set of behavioral rules. The behavior-based analysis phase can be used to determine if the app includes previously known malware, exhibits new malware behaviors, and/or if the app otherwise poses a risk, (e.g., privacy, security, or other risks). In some embodiments, enterprise specific (e.g., custom) rules are performed (e.g., enterprise defined risks, based on an enterprise risk profile). For example, enterprise specific (e.g., custom) rules can include checks for HIPAA compliance for healthcare apps, checks for encryption requirements for data management, and various other types of enterprise specific rules.

In some embodiments, using these phases, a series of data collection engines provided by the platform can extract relevant data about the app, which is then fed to a rules engine. The rules engine extracts relevant data from the information discovered by the other engines for further analysis, processing, and/or as input into an overall risk assessment based on an applicable risk profile.

At 218, an app risk assessment report is generated based on the risk assessment for the analyzed app or a bulk set of apps. In some embodiments, the app risk assessment report is generated for the customer based on a risk profile (e.g., an app risk policy) and general or default reporting requirements. In some embodiments, the app risk assessment report is generated for the customer based on an enterprise risk profile (e.g., enterprise customized app risk policy) and/or customized reporting requirements. In some embodiments, the app risk assessment includes various summary findings as well as supporting data. For example, the app risk assessment can include an app reputation score and/or other relevant or supporting data.

In some embodiments, the app risk assessment report is generated as a HyperText Markup Language (HTML) report.

In some embodiments, the app risk assessment report is generated as a JavaScript Object Notation (JSON) report. In some embodiments, the app risk assessment report is generated in a format specified by a custom enterprise profile. For example, ACME Corporation can configure their reports to be automatically generated as a JSON report. As another example, Jane, who is in corporate IT for ACME Corporation, can configure her reports to be provided as HTML reports, and Mary, who is also in corporate IT for ACME Corporation, can configure her reports to be provided as JSON reports. Various other customizations for reporting format and categories of information can also be provided.

As discussed above, the platform for quantifying the risks of apps for mobile devices uses a series of data collection engines (e.g., as shown in FIG. 1) for implementing the phased approach. For example, using the series of data collection engines for collecting various data, such as discussed above, various new rules can be applied to extract interesting behaviors or characteristics in apps for performing a risk assessment of such apps.

In some embodiments, the phased approach facilitates implementing a feedback loop in which information determined during one phase can affect actions performed in a different phase. For example, information learned from a static analysis phase can affect activities performed in a dynamic phase. For example, if the static analysis phase for a given app includes library calls for performing SMS/text messaging, then during the dynamic phase, emulation tests can include attempting to determine whether the app attempts to send any SMS/text messaging and if it does so with or without previously gaining the user's permission to send SMS/text messages. Various other examples for leveraging a feedback mechanism to enhance the efficiency and effectiveness of the phased approach should now be apparent to one of ordinary skill in the art in view of the various embodiments described herein.

For example, in the byte code analysis and decompilation phases, the platform can determine that an individual app sends a text message via seeing SMS APIs used. The platform can also feed this information to the dynamic analysis engine, so that the emulator can watch for the SMS to be sent or can instrument the emulator to send the SMS text. Once the SMS is sent, the platform can record the number the SMS was sent to, and the SMS message itself. At the collective intelligence phase, the SMS number monitored/detected by the dynamic engine can then be compared to a list of SMS numbers used in malware apps that communicate with paid SMS numbers (e.g., a common malware monetization scheme is to use such paid SMS numbers). If a match is found, then the platform can determine that the app should be classified as malware and a report can be provided showing all of the supporting data.

Various examples of app behaviors that impact app riskiness are provided. For example, whether the app is determined to include malware impacts the app risk assessment. In particular, this includes both known malware (e.g., previously identified malware), repackaged malware, new malware used in targeted attacks, and malware behavior.

As another example, whether the app accesses websites/URLs that are unsafe or associated with malware impacts the app risk assessment. In particular, apps that have been observed to download additional (e.g., malicious) content from URLs associated with malware impacts the app risk assessment.

As another example, the platform can apply its own URL "blacklists" or integrate with third party URL blacklist feed providers.

As another example, whether the app accesses SMS numbers that are unsafe or associated with malware impacts the app risk assessment. In particular, a common malware technique is to subscribe a user to an SMS service that will try to steal user data (e.g., phishing attacks).

As another example, whether the app access SMS numbers that are associated with premium (paid) services impacts the app risk assessment. In particular, a common malware technique is to subscribe a user to a premium SMS service, hiding the actual messages from the user but accruing charges (e.g., certain mal-behaving apps can attempt to generate a monetary return for the app developer by sending unauthorized SMS messages, such as using known bad SMS numbers).

As another example, whether the app performs unrequested behaviors (e.g., a mass text to a whole address book, a mass email to a whole address book, an audio or video recording) impacts the app risk assessment.

As another example, what permissions does the app request can be analyzed to determine whether such behavior impacts the app risk assessment (e.g., how do these compare to the average permission count). In particular, malware authors usually take advantage of the difficult to interpret permissions and hide risky behaviors among benign ones to sneak past the user's review process.

As another example, the source of the app (e.g., which market did the app come from) can be analyzed to determine whether such impacts the app risk assessment. In particular, some app markets (e.g., app markets in China and Russia) are known to include higher amounts of malware.

As another example, the developer of the app (e.g., which developer developed the app) can be analyzed to determine whether such impacts the app risk assessment. In particular, some app developers are known for delivering malware or risky apps in the past while others have better reputations.

As another example, the available market data of the app (e.g., app rating, number of downloads, developer's reputation) can be analyzed to determine whether such impacts the app risk assessment.

As another example, whether the app transmits information in clear-text (e.g., without encryption) can be analyzed to determine whether such impacts the app risk assessment.

As another example, whether the app uses encryption for all of its external communication can be analyzed to determine whether such impacts the app risk assessment. In particular, what type of encryption is used and whether the encryption was implemented correctly can be used for such app risk assessment.

As another example, whether the app transmits account user name information (e.g., with or without user permission, and with or without encryption) can be analyzed to determine whether such impacts the app risk assessment.

As another example, whether the app transmits account password information (e.g., with or without user permission, and with or without encryption) can be analyzed to determine whether such impacts the app risk assessment.

As another example, whether the app locally stores account user name information (e.g., with or without user permission, and with or without encryption) can be analyzed to determine whether such impacts the app risk assessment.

As another example, whether the app locally stores account password information (e.g., with or without user permission, and with or without encryption) can be analyzed to determine whether such impacts the app risk assessment.

As another example, whether the app tracks location information (e.g., with or without user permission, and with or without encryption) can be analyzed to determine whether such impacts the app risk assessment. In particular, if the app tracks location information, how does the app track the location (e.g., does the app location track using GPS, using cell tower triangulation, using GeoIP such as using official APIs or using unofficial APIs).

As another example, whether the app attempts to uniquely identify the user of the mobile device can be analyzed to determine whether such impacts the app risk assessment.

As another example, whether the app shares address book or contact information (e.g., with or without user permission, and with or without encryption) can be analyzed to determine whether such impacts the app risk assessment.

As another example, whether the app includes voice recording capabilities/functions can be analyzed to determine whether such impacts the app risk assessment.

As another example, whether the app includes picture and/or video recording capabilities/functions can be analyzed to determine whether such impacts the app risk assessment.

As another example, whether the app reads/writes to removable storage (e.g., a compact flash card or other types of removable storage) can be analyzed to determine whether such impacts the app risk assessment.

As another example, whether the app performs good behavior(s) (e.g., adding secondary Digital Rights Management (DRM) to protect the app and/or added Virtual Private Network (VPN) support for secure communications) can be analyzed to determine whether such impacts the app risk assessment, in which such good behaviors can be used to improve the scoring of the app's risk assessment.

As another example, an app can be blacklisted (e.g., by the platform and/or by a particular enterprise/customer that can identify apps to be blacklisted so that such are not available in the enterprise app store). For example, if a particular app is blacklisted, such as Dropbox (e.g., or another app), then the platform can block any apps that match Dropbox. Also, the platform can also be configured to dynamically extend this rule for blocking Dropbox to also block any apps that use Dropbox based on static analysis, dynamic analysis, and/or other behavior-based analysis and monitoring (e.g., determining which apps use or incorporate the Dropbox SDK, apps that include calls to URLs to Dropbox, etc.).

In some embodiments, an app risk assessment report is generated based on the risk assessment for an analyzed app, such as using the phase-based analysis discussed above. In some embodiments, the app risk assessment report includes various risks and weights per app. In some embodiments, the app risk assessment report can be customized for an enterprise, such as based on an enterprise's custom app risk profile and/or enterprise's custom report profile. For example, a particular enterprise, such as a Fortune 500 company can configure a custom app risk profile that grey lists an app if an iOS app does not use standard Apple terms and conditions (e.g., so that inside legal counsel for a Fortune 500 company can be notified of such app to review their custom terms and conditions to determine whether such are acceptable for use by their employees based on those unique terms and conditions).

Figure 3:
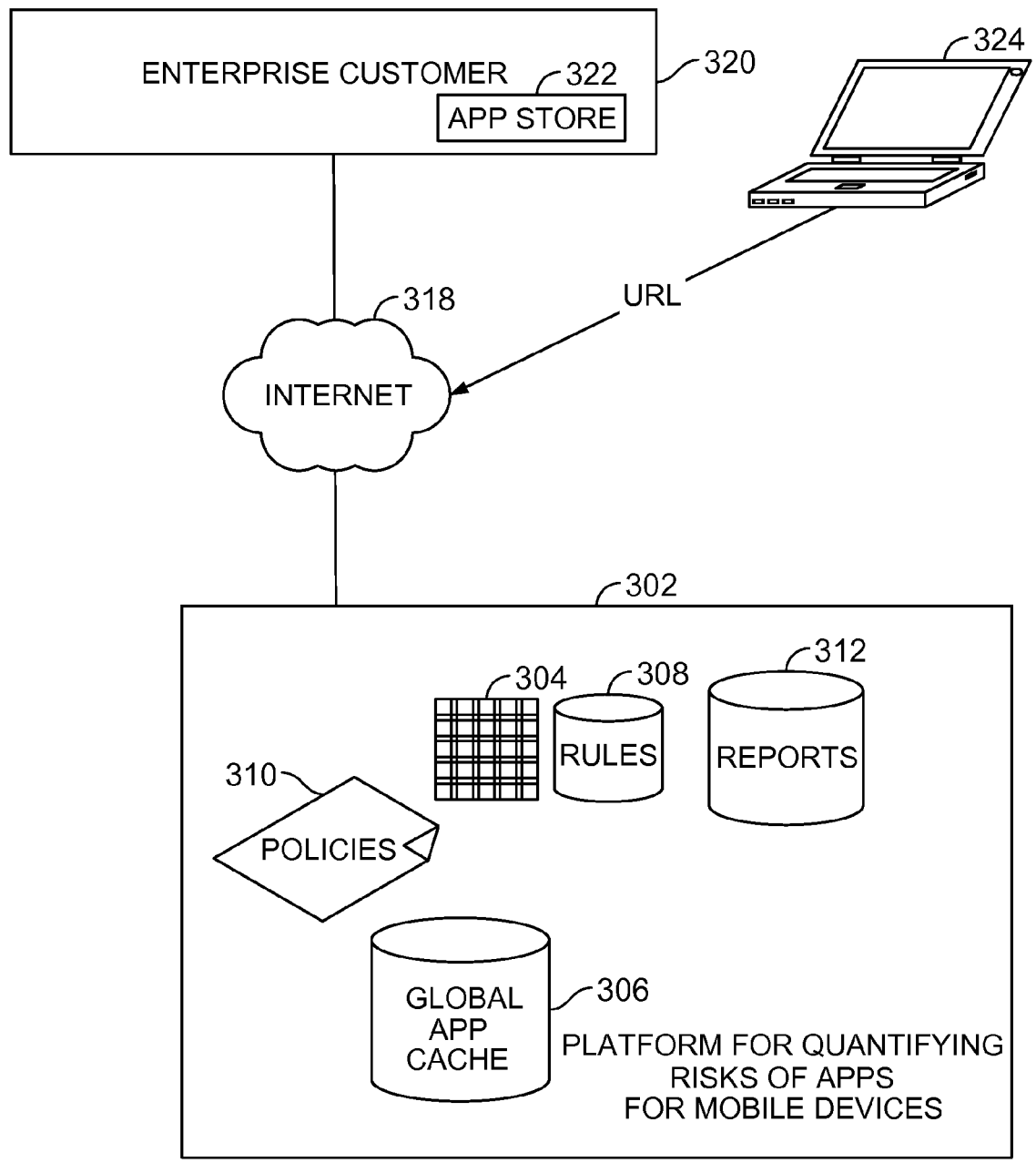
FIG. 3 is another functional block diagram of an architecture for quantifying the risks of apps for mobile devices in accordance with some embodiments.

FIG. 3 is another functional block diagram of an architecture for quantifying the risks of apps for mobile devices in accordance with some embodiments. As shown, a cloud-based platform for quantifying the risks of apps for mobile devices 302 is provided. The platform 302 includes one or more processors 304. In some embodiments, the platform is implemented as a plurality of servers, appliances, virtual machines, and/or combinations thereof. In some embodiments, the platform performs the functions as described above with respect to FIGS. 1 and 2.

As also shown, the platform 302 includes a global app cache 306 for storing previously analyzed apps. The platform 302 also includes policies 310. For example, policies 310 can include various policies for scanning apps for risk assessment (e.g., security policies, privacy policies, device/network integrity policies, etc.). The policies 310 can also include enterprise specific or custom policies, such as custom policies for an enterprise customer 320 (e.g., ACME Corporation), which has an enterprise app store 322 and is in communication with the platform 302 via the Internet 318 as shown. In particular, an authorized user of the enterprise customer (e.g., a corporate IT security admin of ACME Corporation) can access the platform 302 using a device 324 via the Internet 318 (e.g., by securely logging in through a web site, accessed via a URL, such as shown). For example, the authorized user (e.g., a corporate IT team member of ACME Corporation) can configure custom policies, request reports (e.g., individual app reports, bulk app reports, etc.), and/or manage their enterprise account. As also shown, the platform 302 includes various rules 308 for performing various analysis on apps, such as described above with respect to FIG. 2. For example, rules 308 can include various rules (e.g., data and/or executable instructions) that can be processed by the various engines, such as shown in FIG. 1, and applied to perform various app analysis based on an app risk profile, such as implementing the various phases discussed above with respect to FIG. 2.

As also shown, the platform 302 includes a reports data store 312 (e.g., database) for storing reports generated by the platform based on analysis of apps for various users or customers, such as enterprise customer 320. For example, various reports based on apps analysis for ACME Corporation's enterprise app store 322 can be stored in the reports data store. Various reports based on app analysis for other customers or users can also be stored in the reports data store.

FIG. 4 is a screen diagram of an apps view of a user interface for a platform for quantifying risks of apps for mobile devices in accordance with some embodiments. As shown, the apps view 402 lists various apps that have been analyzed including indicating a star rating for each of the apps, a description of each of the apps, a version of each of the apps, a type for each of the apps, categories for each of the apps, and a date/time for a last upload (e.g., time stamp for when the app was last uploaded to the platform for analysis). As also shown, there are various selectable actions under each, such as Details, Ratings, Edit, and Delete. As also shown, the user interface for the platform includes different views, such as for applications (e.g., as shown in 402, users, groups, categories, settings, reports, Ideas, and My Account).

Figure 5:
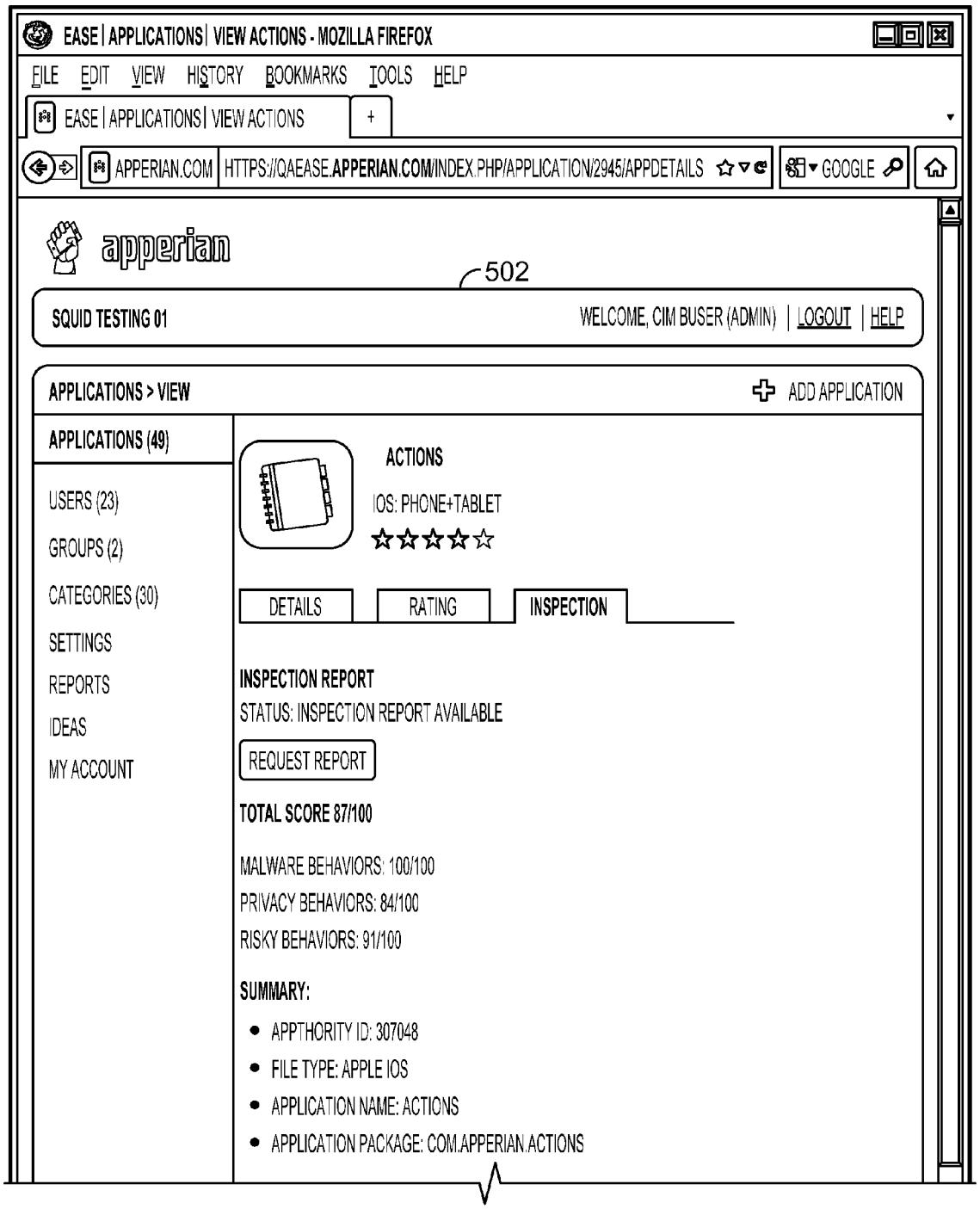
FIG. 5 is a screen diagram of a detailed report for an app analyzed by the platform for quantifying the risks of apps for mobile devices in accordance with some embodiments.

FIG. 5 is a screen diagram of a detailed report for an app analyzed by the platform for quantifying the risks of apps for mobile devices in accordance with some embodiments. In some embodiments, the detailed report 502 is generated by the platform for quantifying risks of apps for mobile devices and can be accessed using a web browser. As shown, the detailed report 502 provides the output of a report generated for an "Actions" app for an iOS phone/tablet, which has been analyzed by the platform and includes a star rating for the app (e.g., 4 stars as shown), with selectable tabs that include Details, Rating, and Inspection. As shown, the Inspection tab is selected and shows the details of the Inspection Report (e.g., reporting a total score of 87/100, including detailed scores for malware behaviors of 100/100, privacy behaviors of 84/100, and risky behaviors of 91/100. As also shown, a summary section is provided, a risky behaviors section is provided, a privacy behaviors section is provided, and a hostname and IP addresses section are provided (e.g., listing reputation information for hostnames and IP addresses that are visited/associated with this app). As would be apparent to one of ordinary skill in the art in view of the various embodiments described herein, various other details and report format and details/information can be provided based on the analysis performed by the platform for quantifying risks of apps for mobile devices as described herein, including based on various user defined customizations (e.g., enterprise customized reporting).

Figure 6:
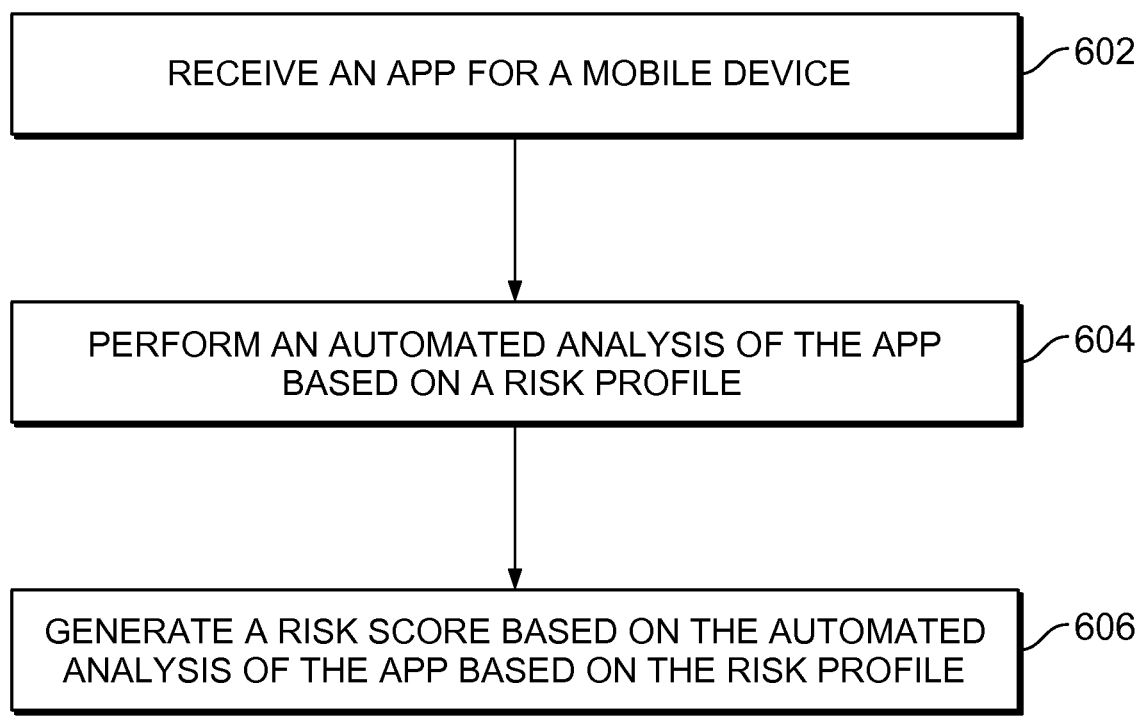
FIG. 6 is a flow diagram for quantifying the risks of apps for mobile devices in accordance with some embodiments.

FIG. 6 is a flow diagram for quantifying the risks of apps for mobile devices in accordance with some embodiments. At 602, an application for a mobile device is received. At 604, an automated analysis of the application based on a risk profile (e.g., using a cloud-based app risk assessment platform/service) is performed. At 606, generating a risk score based on the automated analysis of the application based on the risk profile is performed.

Figure 7:
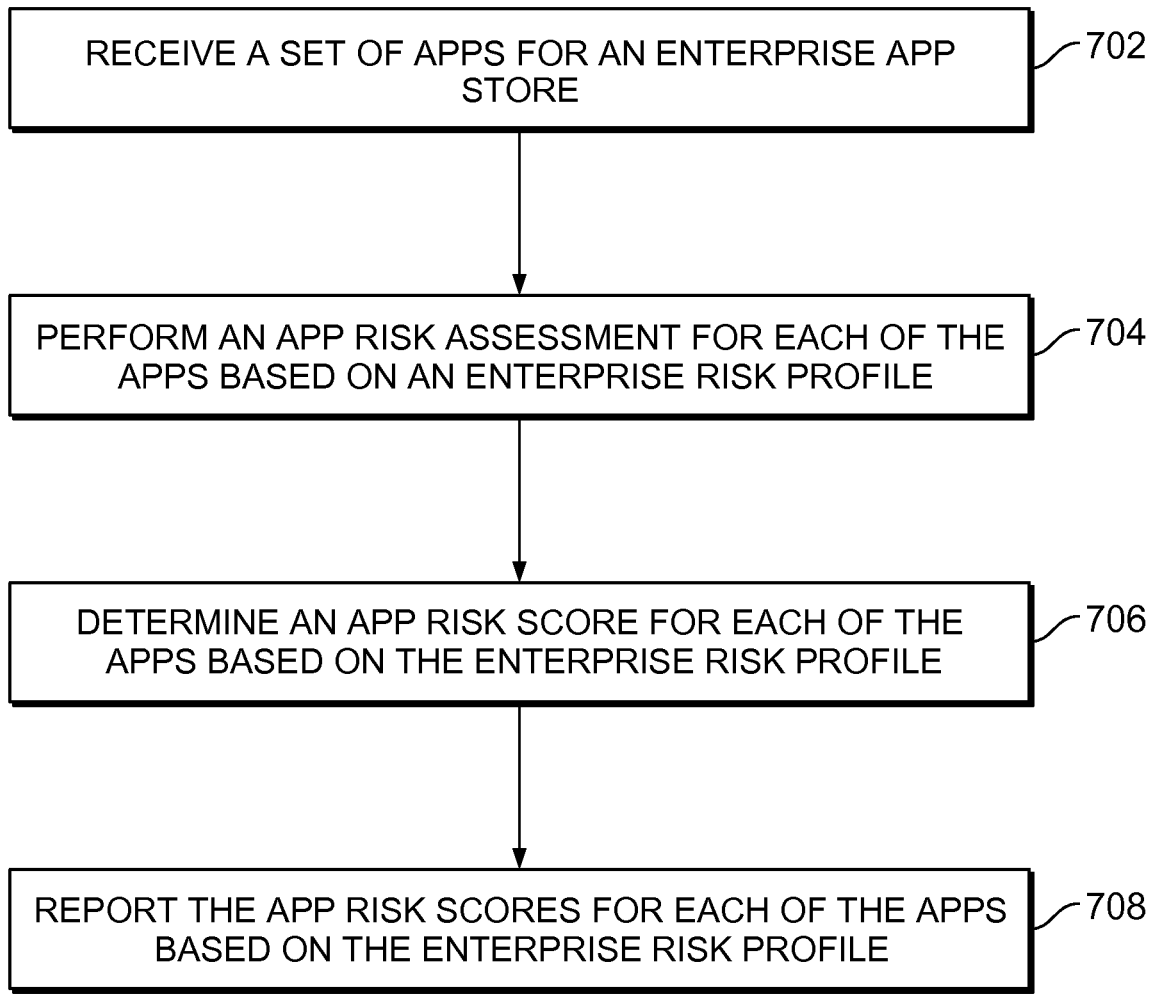
FIG. 7 is another flow diagram for quantifying the risks of apps for mobile devices in accordance with some embodiments.

FIG. 7 is another flow diagram for quantifying the risks of apps for mobile devices in accordance with some embodiments. At 702, a set of apps for an enterprise app store are received. At 704, an automated analysis of each of the apps (e.g., of the set of apps) based on an enterprise risk profile is performed. At 706, determining an app risk score for each of the apps (e.g., of the set of apps) based on the enterprise risk profile is performed. At 708, reporting the app risk scores for each of the apps (e.g., of the set of apps) based on the enterprise risk profile is performed.

For example, using the various techniques described herein, quantifying the risks of apps for mobile devices can be provided by leveraging various mobile application management (MAM) solutions (e.g., enterprise app stores). In particular, MAM solutions, also called "enterprise app stores" store app metadata as well. For example, an enterprise app store (e.g., enterprise app store 118 as shown in FIG. 1) can include or be implemented using a commercially available MAM solution. Example commercially available MAM products in the market today include those sold by Apperian, AppCentral, and other commercial vendors. The typical enterprise app store today has approximately 10 to 50 or more apps inside of it. For example, these apps can be "in-house apps," which are enterprise line of business (LOB) applications for performing a specific task or apps for which the enterprise wants all employees to have access to for installing on their mobile devices (e.g., a sales related app for its sales personnel, and/or other types of apps for all or particular categories of users). In some embodiments, the platform for quantifying the risks of apps for mobile devices similarly supports receiving such store app metadata (e.g., using a bulk query) to identify which apps in the enterprise app store violate a policy (e.g., a malware policy, an enterprise policy, and/or another mobile app policy) using similar techniques as described herein with respect to various embodiments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for quantifying risks of applications ("apps") for mobile devices, comprising:
a processor configured to:
receive an application for a mobile device;
perform a pre-screening phase that includes checking an application cache, wherein the application cache includes previously determined risk scores for previously analyzed apps;
in the event that a previously determined risk score of the application is not returned based at least in part on the pre-screening phase, perform an automated analysis of the application based on a risk profile, wherein the risk profile is based on an enterprise policy that includes custom rules for scanning of apps based on security requirements to determine whether the application includes previously known malware, exhibits new malware behaviors, poses a privacy or security risk, or any combination thereof;
generate a risk score based on the automated analysis of the application based on the risk profile; and
perform an action based on the risk score; and
a memory coupled to the processor and configured to provide the processor with instructions.

2. The system recited in claim 1, wherein perform the action based on the risk score includes:
report the risk score.

3. The system recited in claim 1, wherein the processor is further configured to:
determine whether the application is in violation of the enterprise policy, wherein the enterprise policy includes a malware policy for apps.

4. The system recited in claim 1, wherein the processor is further configured to:
customize the risk score based on a customized risk scoring profile, wherein the customized risk scoring profile includes an enterprise-based customization.

5. The system recited in claim 1,
wherein the application cache includes risk scores for previously analyzed apps that are available from a public app store.

6. The system recited in claim 1, wherein the processor is further configured to:
respond to an app query using the application cache.

7. The system recited in claim 1,
wherein checking the application cache includes:
determine whether the application has been previously analyzed; and
in the event that the application has been previously analyzed, determine whether to return the previously determined risk score of the application.

8. The system recited in claim 1, wherein the processor is further configured to:
query public app market data relating to the application, the public app market data including an application description, an application ranking in a store, a vendor reputation of the application, or any combination thereof.

9. The system recited in claim 1, wherein the processor is further configured to:
extract metadata associated with the application, the metadata comprising application permissions, file and version name, author of the application, application ID, package name, or any combination thereof; and
query public app market data relating to the application based on the extracted metadata associated with the application, the public app market data including an application description, an application ranking in a store, a vendor reputation of the application, or any combination thereof.

10. The system recited in claim 1, wherein the processor is further configured to:
upload the application from a private app store to perform the automated analysis of the application based on the risk profile.

11. The system recited in claim 1, wherein the processor is further configured to:
upload the application from a private app store to perform the automated analysis of the application based on the risk profile, wherein the application is marked as private and is hidden from global application cache queries performed during a pre-screening phase.

12. The system recited in claim 1, wherein the processor is further configured to:
    determine whether the application performs one or more of sending text/SMS messages without user's permission or using GPS/location services without user's permission.

13. The system recited in claim 1, wherein the processor is further configured to:
    determine a reputation associated with the application.

14. The system recited in claim 1, wherein the processor is further configured to:
    perform a static analysis on the application during the automated analysis of the application based on the risk profile.

15. The system recited in claim 1, wherein the processor is further configured to:
    perform a dynamic analysis on the application during the automated analysis of the application based on the risk profile.

16. The system recited in claim 1, wherein the processor is further configured to:
    perform a dynamic analysis on the application during the automated analysis of the application based on the risk profile, wherein performing the dynamic analysis includes simulating a plurality of behaviors of the application during execution on a mobile device platform.

17. A method of quantifying risks of applications ("apps") for mobile devices, comprising:
    receiving an application for a mobile device;
    performing a pre-screening phase that includes checking an application cache, wherein the application cache includes previously determined risk scores for previously analyzed apps;
    in the event that a previously determined risk score of the application is not returned based at least in part on the pre-screening phase, performing an automated analysis of the application based on a risk profile, wherein the risk profile is based on an enterprise policy that includes custom rules for scanning of apps based on security requirements to determine whether the application includes previously known malware, exhibits new malware behaviors, poses a privacy or security risk, or any combination thereof;
    generating a risk score based on the automated analysis of the application based on the risk profile; and
    performing an action based on the risk score.

18. The method of claim 17, wherein performing the action based on the risk score includes:
    reporting the risk score.

19. The method of claim 17, further comprising:
    determining whether the application is in violation of the enterprise policy, wherein the enterprise policy includes a malware policy for apps.

20. The method of claim 17, further comprising:
    customizing the risk score based on a customized risk scoring profile, wherein the customized risk scoring profile includes an enterprise-based customization.

21. A computer program product for quantifying risks of applications ("apps") for mobile devices, the computer program product being embodied in a non-transitory computer readable storage medium and comprising computer instructions for:
    receiving an application for a mobile device;
    performing a pre-screening phase that includes checking an application cache, wherein the application cache includes previously determined risk scores for previously analyzed apps;
    in the event that a previously determined risk score of the application is not returned based at least in part on the pre-screening phase, performing an automated analysis of the application based on a risk profile, wherein the risk profile is based on an enterprise policy that includes custom rules for scanning of apps based on security requirements to determine whether the application includes previously known malware, exhibits new malware behaviors, poses a privacy or security risk, or any combination thereof;
    generating a risk score based on the automated analysis of the application based on the risk profile; and
    performing an action based on the risk score.

22. The computer program product recited in claim 21, wherein performing the action based on the risk score includes:
    reporting the risk score.

23. The computer program product recited in claim 21, further comprising computer instructions for:
    determining whether the application is in violation of the enterprise policy, wherein the enterprise policy includes a malware policy for apps.

24. The computer program product recited in claim 21, further comprising computer instructions for:
    customizing the risk score based on a customized risk scoring profile, wherein the customized risk scoring profile includes an enterprise-based customization.

25. The computer program product recited in claim 21, further comprising computer instructions for:
    responding to an app query using the application cache, wherein the application cache includes risk scores for previously analyzed apps that are available from a public app store.

26. The computer program product recited in claim 21, wherein checking the application cache includes:
    determining whether the application has been previously analyzed; and
    in the event that the application has been previously analyzed, determining whether to return the previously determined risk score of the application.

27. The computer program product recited in claim 21, further comprising computer instructions for:
    extracting metadata associated with the application, the metadata comprising application permissions, file and version name, author of the application, application ID, package name, or any combination thereof; and
    querying public app market data relating to the application based on the extracted metadata associated with the application, the public app market data including an application description, an application ranking in a store, a vendor reputation of the application, or any combination thereof.

28. The computer program product recited in claim 21, further comprising computer instructions for:
    uploading the application from a private app store to perform the automated analysis of the application based on the risk profile, wherein the application is marked as private and is hidden from global application cache queries performed during a pre-screening phase.

29. The computer program product recited in claim 21, further comprising computer instructions for:
    determining a reputation associated with the application.

30. The computer program product recited in claim 21, further comprising computer instructions for:

performing a dynamic analysis on the application during the automated analysis of the application based on the risk profile, wherein performing the dynamic analysis includes simulating a plurality of behaviors of the application during execution on a mobile device platform.

* * * * *